United States Patent [19]

Sato

[11] Patent Number: 5,343,502

[45] Date of Patent: Aug. 30, 1994

[54] SYMBOL TIMING DETECTING CIRCUIT

[75] Inventor: Toshifumi Sato, Tokyo, Japan

[73] Assignee: NEC Corporation, Tokyo, Japan

[21] Appl. No.: 982,950

[22] Filed: Nov. 30, 1992

[30] Foreign Application Priority Data

Nov. 29, 1991 [JP] Japan .................. 3-316942

[51] Int. Cl.$^5$ ............................ H04L 7/027
[52] U.S. Cl. ..................... 375/106; 375/86; 375/118
[58] Field of Search ............... 375/106, 111, 110, 54, 375/83, 85, 86, 118, 119; 329/304

[56] References Cited

U.S. PATENT DOCUMENTS

| Re. 34,206 | 3/1993 | Sayar ..................... 375/118 |
| 3,599,103 | 8/1971 | LeGarde ................. 375/119 |
| 4,128,828 | 12/1978 | Samejima et al. ........ 375/85 |
| 4,672,447 | 6/1987 | Möring et al. .......... 375/111 |
| 4,941,155 | 7/1990 | Chuang et al. .......... 375/106 |
| 5,122,758 | 6/1992 | Tomita ................... 375/84 |
| 5,235,622 | 8/1993 | Yoshida .................. 375/106 |
| 5,243,630 | 9/1993 | Rhebergen ............... 375/106 |

FOREIGN PATENT DOCUMENTS 3-188736  8/1991  Japan .

*Primary Examiner*—Stephen Chin
*Assistant Examiner*—Timothy J. May
*Attorney, Agent, or Firm*—Foley & Lardner

[57] ABSTRACT

An amplitude detection circuit generates an amplitude signal by detecting an amplitude of a received signal modulated by $\pi/4$ shift QPSK, and a first shift register and all amplitude difference detection circuit calculate an amplitude difference signal from the amplitude signal. Then, a second shift register and a calculation circuit calculate an amplitude difference accumulation signal from the amplitude difference signal, and a decision circuit generates a preset signal by deciding a sampling time from the amplitude difference accumulation signal and a preset signal. A counter divides a master clock signal by the preset signal, thereby generating a symbol clock signal.

3 Claims, 5 Drawing Sheets

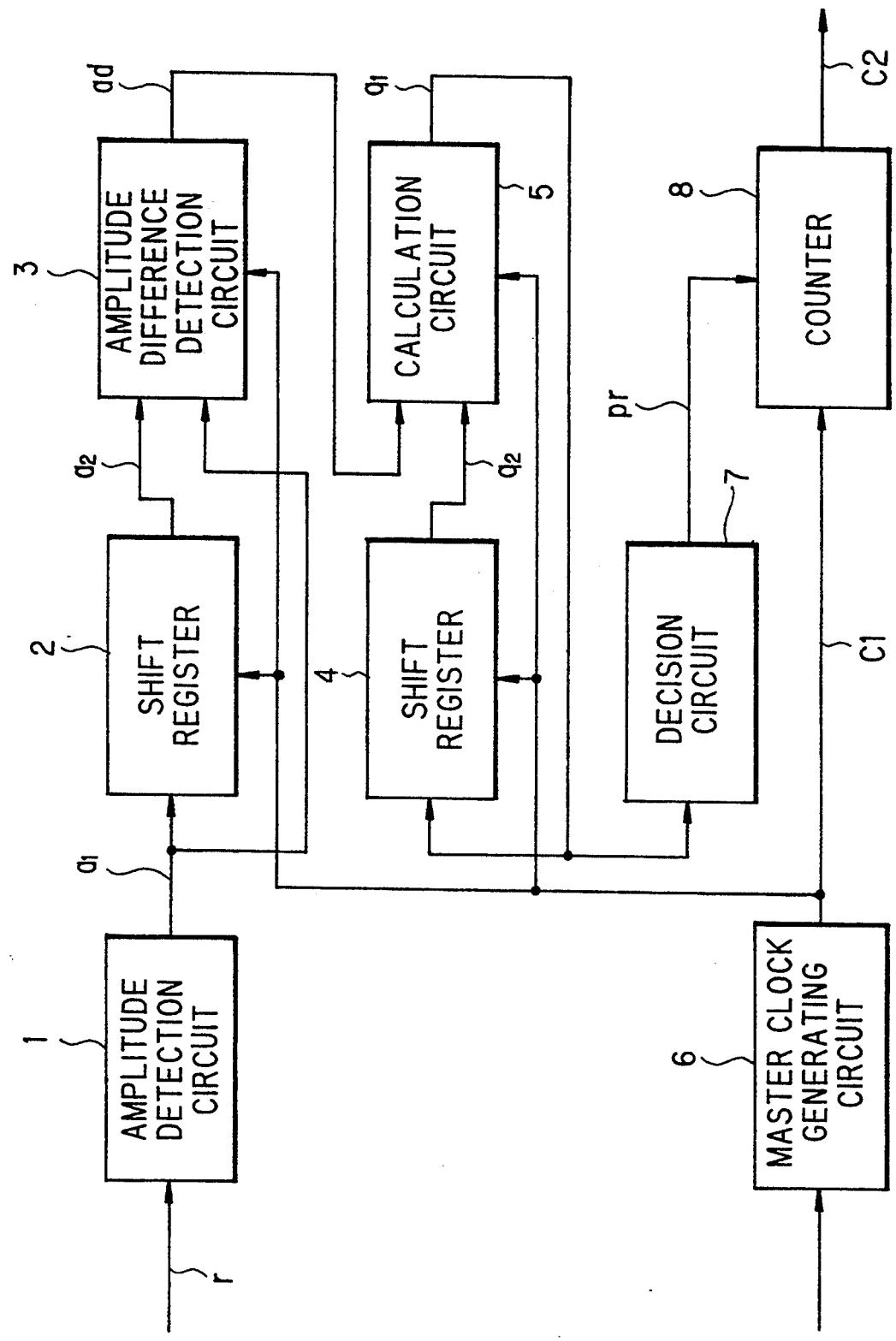

SYMBOL TIMING DETECTING CIRCUIT

FIELD OF THE INVENTION

This invention relates a symbol timing detecting circuit, and more particularly to, a symbol timing detecting circuit for a receiver receiving a TDMA signal modulated in a $\pi/4$ shift QPSK system.

BACKGROUND OF THE INVENTION

In a mobile communication system, the fading occurs due to signal paths. As a result, signals are subject to random carrier-wave fluctuation. For this reason, the adoption of synchronous detection is difficult in low speed digital communication. Conventionally, therefore, delay detection is used in such communication. In carrying out the delay detection, it is necessary to detect a symbol timing. For this purpose, a symbol timing detecting circuit includes an amplitude information detecting circuit and a narrow band-pass filter.

In this symbol timing detecting circuit, a carrier-wave signal modulated by $\pi/4$ shift QPSK is supplied to the amplitude information detecting circuit, in which a symbol timing signal component generated. The symbol timing signal component is supplied to the low narrow band-pass filter, from which a symbol timing signal is obtained. The detail of the symbol timing detecting circuit is explained in the Japanese Patent Kokai No. 3-188736, the published date of which is Aug. 16, 1992.

According to the conventional symbol timing detecting circuit, however, there is a disadvantage in that it is difficult to be included in an LSI, because it is structured by analog circuits. Further, there is a disadvantage in that the circuit adjustment is required in each system, because a sampling timing of a received signal is not coincident with a phase of an output signal supplied from the narrow band-pass filter. Still further, there is a disadvantage in that it is impossible to receive a burst signal which is particular to a TDMA signal, because a synchronous pull-in time is large under the condition that "Q" of the narrow band-pass filter is high.

SUMMARY OF THE INVENTION

Accordingly, it is an object of the invention to provide a symbol timing detecting circuit which can be included in an LSI.

It is a further object of the invention to provide a symbol timing detecting circuit in which no circuit adjustment is required.

It is a still further object of the invention to provide a symbol timing detecting circuit by which a burst signal can be received.

According to the invention, a symbol timing detecting circuit, comprises:

an amplitude detecting circuit for detecting an amplitude of a received signal of a TDMA signal modulated by $\pi/4$ shift QPSK to generate an amplitude signal;

a master clock generating circuit for multiplying a symbol rate by N which is a predetermined positive integer to generate a master clock signal;

a first N stage shift register for storing said amplitude signal in accordance with said master clock signal;

an amplitude difference detection circuit for calculating a difference between said amplitude signal and an output signal of said first N stage shift register in accordance with said master clock signal;

a second N stage shift register for storing an amplitude difference accumulation value in accordance with said master clock signal;

an amplitude difference calculation circuit for adding an output signal of said amplitude difference detection circuit and an output signal of said second N stage shift register in accordance with said master clock signal to generated said amplitude difference accumulation value;

a decision circuit for deciding a sampling timing in accordance with said amplitude difference accumulation value to generated a preset signal; and an N counter for dividing said master clock signal by said preset signal to generated a symbol clock signal.

BRIEF DESCRIPTION OF THE DRAWINGS

The invention will be described in more detail in conjunction with appended drawings; wherein:

FIG. 1 is a block diagram showing a symbol timing detecting circuit of a first preferred embodiment according to the invention;

DESCRIPTION OF THE PREFERRED EMBODIMENTS

Figure 2A:
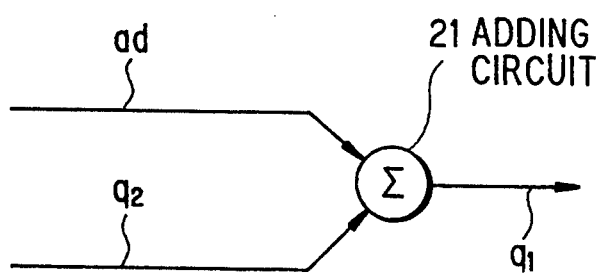
FIGS. 2A and 2B are diagrams showing calculation circuits used in the first preferred embodiment.

FIG. 1 shows a symbol Liming detecting circuit of the first preferred embodiment which comprises an amplitude detection circuit 1 for generating an amplitude signal a1 by detecting an amplitude of a received signal r, a master clock generating circuit 6 for a master clock signal c1 which is N times a symbol rate (N is a predetermined positive integer), a first N stage shift register 2 for storing the amplitude signal a1 in accordance with the master clock signal c1, an amplitude difference detection circuit 3 for calculating a difference between the amplitude signal a1 and an output signal a2 of the shift register 2 in accordance with the master clock signal c1, a second N stage shift register 4 for storing accumulation value q1 of supplied amplitude signals in accordance with the master clock signal c1, an amplitude difference calculation circuit 5 for generating the amplitude difference accumulation value q1 by adding an output amplitude signal ad of the amplitude difference detection circuit 3 and an output signal q2 of the shift register 4 in accordance with the master clock signal c1, a decision circuit 7 for generating a preset signal pr by deciding a sampling t lining in accordance with a prescribed value and the amplitude difference accumulation value q1 of the calculation circuit 5, and an N-decinormal counter 8 for generating a symbol clock signal c2 by dividing the master clock signal c1 in accordance with the master clock signal c1 and the preset signal pr.

In operation, the amplitude detection circuit 1 detects an amplitude of the received signal r modulated by the $\pi/4$ shift QPSK to provide the amplitude signal a1 which is a converted digital signal, and the shift register 2 stores the amplitude signals a1 in turn to be supplied therefrom, and supplies a amplitude signal a2 corresponding to a time prior to one symbol to the amplitude difference detection circuit 3, in which the subtraction is carried out between the present time-amplitude signal a1 and the amplitude signal a2 of the time prior to one symbol to provide the amplitude difference signal ad, as defined below.

$$ad = |a1 - a2|$$

In the calculation circuit 5, the amplitude difference accumulation value q1 representing a precision of a sampling time is obtained by using the amplitude difference signal ad and the output signal q2 of the shift register 4 in accordance with the phenomenon of the $\pi/4$ shift QPSK signal that an amplitude value is a constant value at a sampling time when a received signal is decided. The shift register 4 is used to accumulate the precision of sampling times in each N timings. The decision circuit 7 supplies a preset signal pr to the counter 8 at a sampling time when the amplitude difference accumulation value q1 is less than a prescribed value, and the counter 8 divides the master clock signal c1 to generate a symbol clock signal c2 in accordance with the preset signal pr. Consequently, the symbol clock signal c2 is synchronous with the sampling timing of the received signal r. In this symbol timing detecting circuit, the shift registers 2 and 4 may be composed of a ring buffer by using a RAM.

One example of the calculation circuit 5 is shown in 2A. This type of the calculation circuit 5 comprises an adding circuit 21, in which the amplitude difference signal ad and the output signal q2 of the shift register 4 are added to provide the accumulation value q1, as defined below.

$$q1 = ad + q2$$

At the sampling time, the amplitude difference signal ad is zero, the amplitude difference accumulation value q1 must be the minimum value, if the shift register 4 has been cleared at the start of receiving the signal r. This type of the calculation circuit 5 is well adapted to a circuit for receiving a burst signal.

Figure 2B:
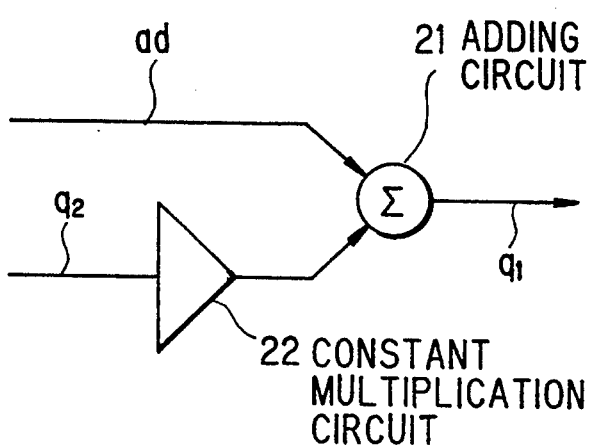
Figure 3A:
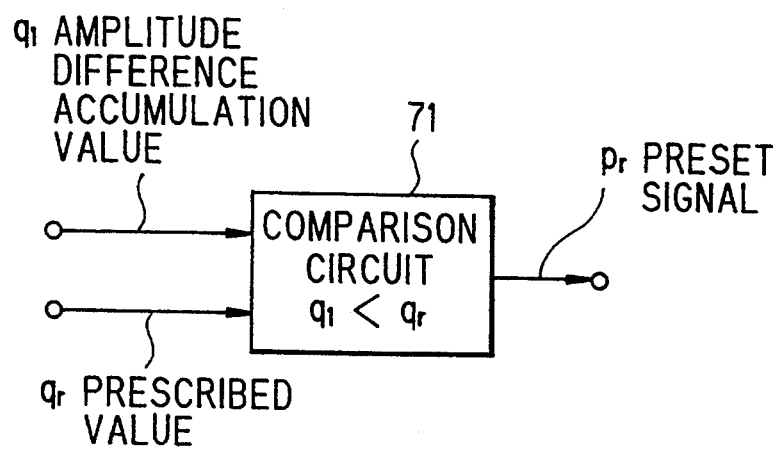
FIG. 3A to 3C are block diagrams showing decision circuits used in the first preferred embodiment.

Another example of the calculation circuit 5 is shown in FIG. 2B. This calculation circuit 5 further comprises a constant multiplication circuit 22 in addition to the structure of FIG. 2A. The constant multiplication circuit has a constant which is less than "1", so that data in the past is forgotten in accordance with the multiplication of the time constant value. This calculation circuit 5 is used as a circuit for holding the symbol synchronism in receiving the received signal continuously. FIG. 3A shows one example of the decision circuit 7 in which the prescribed value qr is fixed, and the amplitude difference accumulation value q1 and the fixed value qr are supplied to a comparison circuit 71 to provide the preset signal pr, when the value q1 is less than the value qr, because the probability of a sampling timing is high, when the amplitude difference accumulation value q1 is small.

Figure 3B:
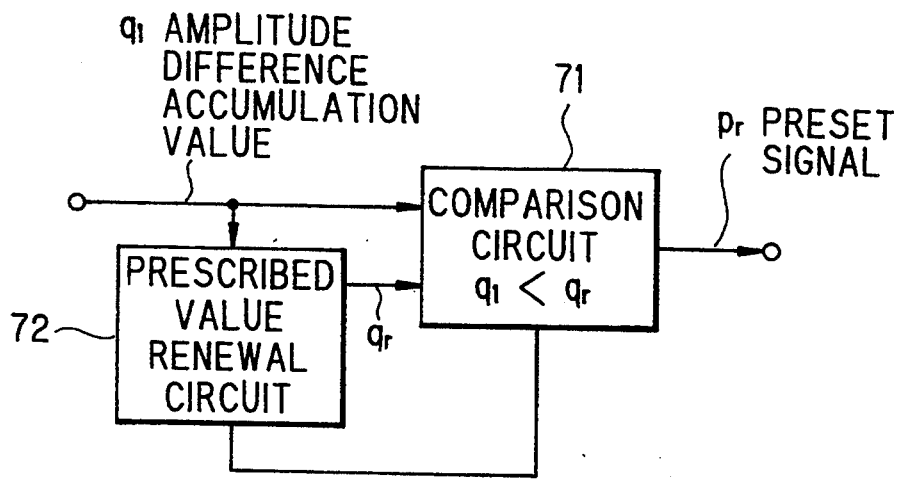

FIG. 3B shows a further example of the decision circuit 7 comprising a comparison circuit and a prescribed value renewal circuit 72 having a prescribed value qr which is the maximum value of the amplitude difference accumulation signal q1, wherein the preset signal pr is generated, when the value q1 is less than the value qr.

Figure 3C:
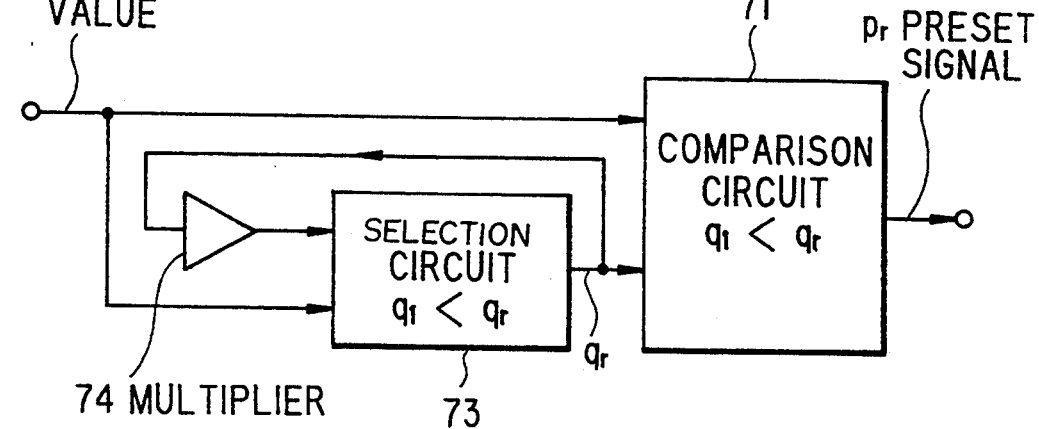

FIG. 3C shows a still further example of the decision circuit 7 comprising a comparison circuit 71, a selection circuit 73, and a multiplier 74, wherein the preset signal pr is generated in the comparison circuit 71, when the amplitude difference accumulation value q1 is less than the prescribed value qr supplied from the selection circuit 73, and the prescribed value qr is replaced by the presently processed amplitude difference accumulation value q1, while the amplitude difference accumulation value q1 is multiplied in the multiplier 74 by a predetermined constant, when the value q1 is more than the value gr.

Figure 4:
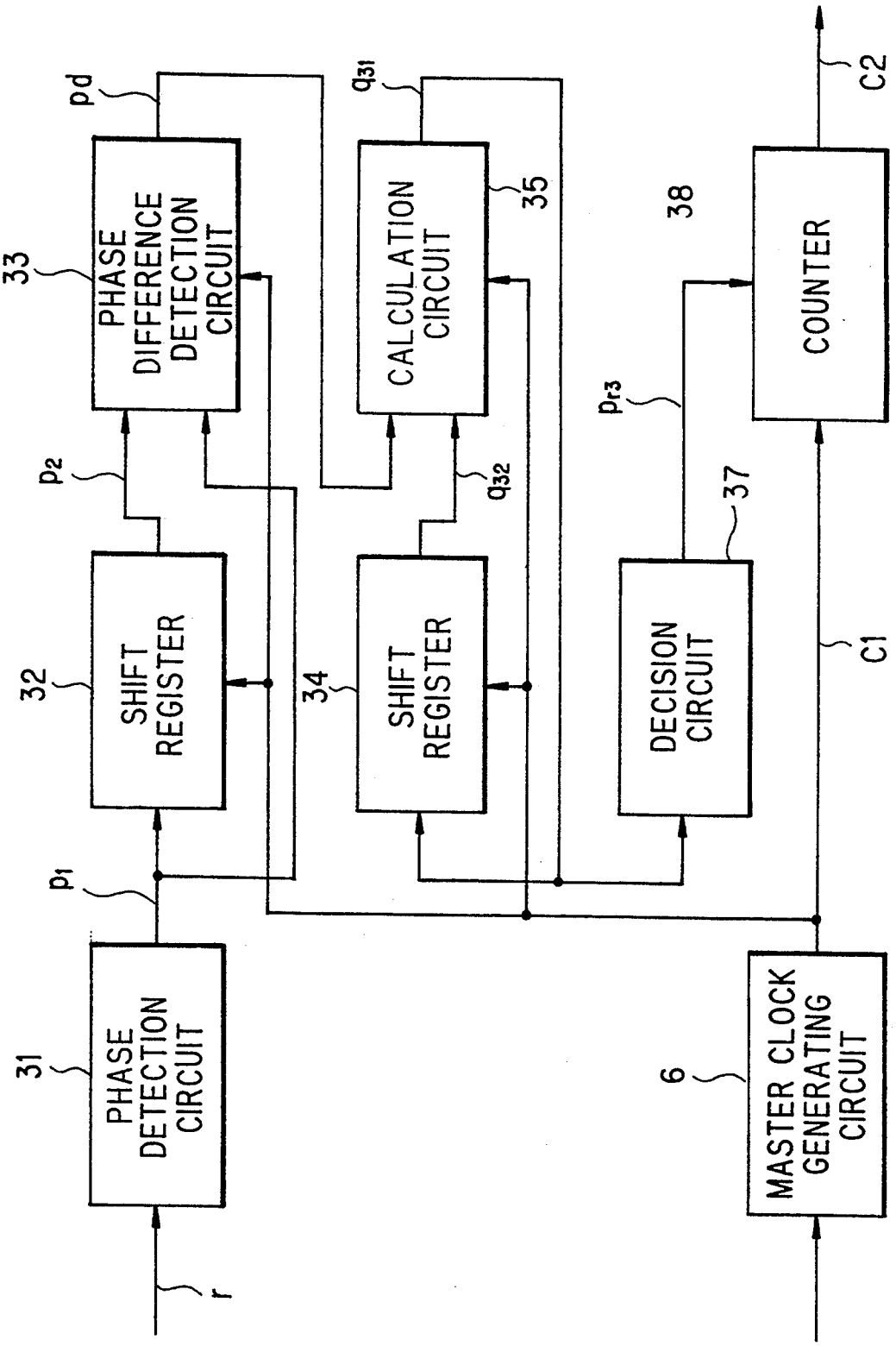
FIG. 4 is a block diagram showing a symbol timing detecting circuit of a second preferred embodiment according to the invention.

Next, a symbol timing detecting circuit of the second preferred embodiment according to the invention will be explained in FIG. 4.

The symbol timing detecting circuit comprises a phase detection circuit 31, shift registers 32 and 34, a phase difference detection circuit 33, a calculation circuit 35, a decision circuit 37, and an N-decinormal counter 38.

In operation, a phase is detected in the phase detection circuit 31 to generate a phase signal p1 by receiving a received signal r modulated by $\pi/4$ shift QPSK. A master clock signal c1 which is N times a symbol rate is generated in the master clock generating circuit 6. The shift register 32 stores the phase signals p1 in turn supplied from the phase detection circuit, and supplies a phase signal p2 corresponding to a time prior to one symbol to the phase difference detection circuit 33, in which a difference of the phase signals p1 and p2 is calculated by the subtraction as set out below.

$$pd = 1 - p2$$

In the calculation circuit 35, a phase difference accumulation value q31 which is representative of a precision of a sampling timing is calculated in accordance with the phase difference signal pd and an output signal q32 of the shift register 34 under the phenomenon that a phase difference is constantly any one of $\pm\pi/4$, and $\pm 3\pi/4$ at a sampling time when a received $\pi/4$ shift QPSK signal is decided. The shift register 34 is used to accumulate the precisions of the sampling timings in each N timings. The decision circuit 37 supplies a preset signal pr3 to preset the counter 38 by deciding that a time is a sampling time, when a phase difference accumulation value q31 supplied from the calculation circuit 35 is less than a prescribed value. Upon the receipt of the preset signal pr3, the counter 38 divides the master clock signal c1 to generate a symbol clock signal c2.

Figure 5A:
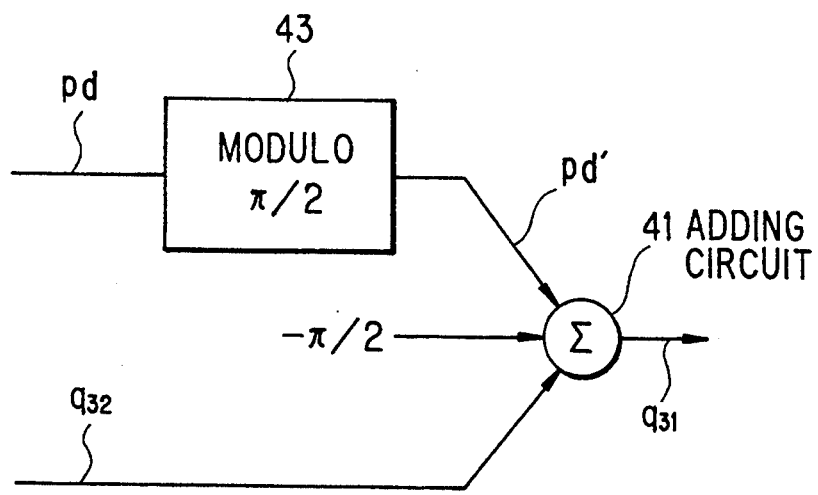
FIGS. 5A and 5B are block diagrams showing calculation circuits used in the second preferred embodiment.

FIG. 5A shows one example of the calculation circuit 35 comprising an adding circuit 41 and a modulo circuit 43. In the modulo circuit 43, modulo $\pi/2$ of the phase difference signal pd is calculated to provide an output signal pd' ranging 0 to $\pi/2$. In the adding circuit 41, the output signal pd', $-\pi/2$ and the output signal q32 of the shift register 34 are added to provide the phase difference accumulation value q31 difference accumulation value q31, as set out below.

$$q31 = pd' - \pi/2 + q32$$

The phase difference signal pd' is $\pi/2$ at a sampling time, so that the phase difference accumulation value q31 must be the millimum value, if the shift register 34 has been cleared at the start of receiving a signal. When the phase difference signal pd is represented by binary numbers (for instance, $2\pi = 2^k$), the modulo circuit 43 will be a circuit which neglects upper two bits to be simplified in structure. This calculation circuit 35 is suitable for the receiving of a burst signal.

Figure 5B:
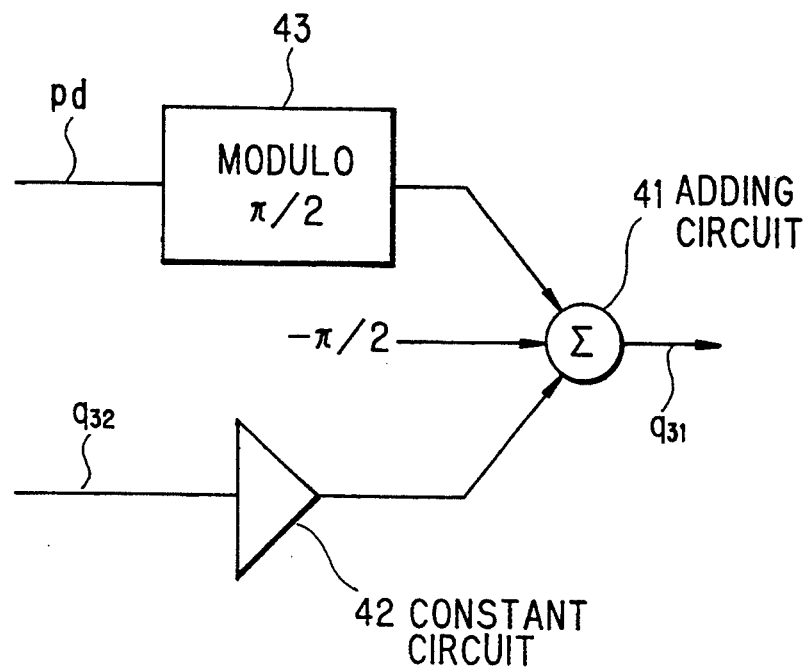

FIG. 5B shows another example of the calculation circuit 35 which further comprises a constant multiplication circuit 42 in addition to the structure of FIG. 5A, wherein the output signal q32 of the shift register 34 is multiplied by a constant of the constant multiplication circuit 42. The constant is selected to be less than "1", as explained in the first preferred embodiment. This calculation circuit 35 is used for a circuit for holding the symbol synchronism in receiving a received signal continuously.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. A symbol synchronism circuit, comprising:
an amplitude detecting circuit for detecting an amplitude of a received signal of a TDMA signal modulated by $\pi/4$ shift OPSK to generate an amplitude signal;
a master clock generating circuit for multiplying a symbol rate by N which is a predetermined positive integer to generate a master clock signal;
a first N stage shift register for storing said amplitude signal in accordance with said master clock signal;
an amplitude difference detection circuit for calculating a difference between said amplitude signal and an output signal of said first N stage shift register in accordance with said master clock signal;
a second N stage shift register for storing an amplitude difference accumulation value in accordance with said master clock signal;
an amplitude difference calculation circuit for adding an output signal of said amplitude difference detection circuit and an output signal of said second N stage shift register in accordance with said mater clock signal to generate said amplitude difference accumulation value;
a decision circuit for deciding a sampling timing in accordance with said amplitude difference accumulation value to generate a preset signal; and
an N counter for dividing said master clock signal by said preset signal to generate a symbol clock signal; and wherein said amplitude difference calculation circuit comprises an N-decinormal constant multiplication circuit for multiplying said output signal of said second N stage shift register by a time constant value, prior to an addition thereof to said amplitude difference signal.

2. A symbol synchronism circuit, comprising:
an amplitude detecting circuit for detecting an amplitude of a received signal of a TDMA signal modulated by $\pi/4$ shift OPSK to generate an amplitude signal;
a master clock generating circuit for multiplying a symbol rate by N which is a predetermined positive integer to generate a master clock signal;
a first N stage shift register for storing said amplitude signal in accordance with said master clock signal;
an amplitude difference detection circuit for calculating a difference between said amplitude signal and an output signal of said first N stage shift register in accordance with said master clock signal;
a second N stage shift register for storing an amplitude difference accumulation value in accordance with said master clock signal;
an amplitude difference calculation circuit for adding an output signal of said amplitude difference detection circuit and an output signal of said second N stage shift register in accordance with said master clock signal to generate said amplitude difference accumulation value;
a decision circuit for deciding a sampling timing in accordance with said amplitude difference accumulation value to generate a preset signal, said decision circuit comprising a comparison circuit for generating said preset signal, when said amplitude difference accumulation signal is less than prescribed value, and a prescribed value renewal circuit for replacing said prescribed value by a minimum value of said amplitude difference accumulation value; and
an N counter for dividing said master clock signal by said preset signal to generate a symbol clock signal.

3. A symbol synchronism circuit, comprising:
an amplitude detecting circuit for detecting an amplitude of a received signal of a TDMA signal modulated by $\pi/4$ shift OPSK to generate an amplitude signal;
a master clock generating circuit for multiplying a symbol rate by N which is a predetermined positive integer to generate a master clock signal;
a first N stage shift register for storing said amplitude signal in accordance with said master clock signal;
an amplitude difference detection circuit for calculating a difference between said amplitude signal and an output signal of said first N stage shift register in accordance with said master clock signal;
a second N stage shift register for storing an amplitude difference accumulation value in accordance with said master clock signal;
an amplitude difference calculation circuit for adding an output signal of said amplitude difference detection circuit and an output signal of said second N stage shift register in accordance with said master clock signal to generate said amplitude difference accumulation value;
a decision circuit for deciding a sampling timing in accordance with said amplitude difference accumulation value to generate a preset signal, said decision circuit comprising a comparison circuit for generating said preset signal, when said amplitude difference accumulation signal is less than a prescribed value, a multiplier for multiplying said prescribed value by a predetermined value, and a selection circuit for selecting one of said amplitude difference accumulation values or an output signal of said multiplier to generate said prescribed value; and
an N counter for dividing said master clock signal by said preset signal to generate a symbol clock signal.

* * * * *